US010724860B2

(12) United States Patent
Nishita et al.

(10) Patent No.: US 10,724,860 B2
(45) Date of Patent: Jul. 28, 2020

(54) SURVEYING DEVICE AND SURVEY SYSTEM

(71) Applicant: Topcon Corporation, Itabashi-Ku, Tokyo (JP)

(72) Inventors: Nobuyuki Nishita, Hadano (JP); Jumpei Kochi, Warabi (JP); Satoshi Yanobe, Odawara (JP)

(73) Assignee: Topcon Corporation, Itabashi-ku, Tokyo (JP)

( * ) Notice: Subject to any disclaimer, the term of this patent is extended or adjusted under 35 U.S.C. 154(b) by 28 days.

(21) Appl. No.: 15/890,635

(22) Filed: Feb. 7, 2018

(65) Prior Publication Data

US 2018/0231380 A1 Aug. 16, 2018

(30) Foreign Application Priority Data

Feb. 10, 2017 (JP) ................................. 2017-023658

(51) Int. Cl.
*G01C 11/02* (2006.01)
*H04N 5/225* (2006.01)
*G06T 7/73* (2017.01)
*B64D 47/08* (2006.01)
*B64C 39/02* (2006.01)
*G01C 15/00* (2006.01)

(52) U.S. Cl.
CPC ............ *G01C 11/02* (2013.01); *B64C 39/024* (2013.01); *B64D 47/08* (2013.01); *G01C 15/002* (2013.01); *G06T 7/74* (2017.01); *H04N 5/2257* (2013.01); *B64C 2201/127* (2013.01); *G06T 2207/10032* (2013.01); *G06T 2207/30244* (2013.01)

(58) Field of Classification Search
CPC .. G05D 1/0094; G08G 5/0069; G08G 5/0073; B64C 39/024; B64C 2201/127; B64C 2201/123; B64C 2201/146; B64C 2201/024; B64C 2201/141; B64C 2201/145; B64C 2201/027; B64C 2201/108; B64C 2201/14; B64D 45/00; G06T 2207/10032; G06T 2207/30181; G03B 15/006; G03B 35/02; H04N 13/221
USPC .......................... 348/135, 142–144, 149, 50
See application file for complete search history.

(56) References Cited

U.S. PATENT DOCUMENTS 5,293,191 A * 3/1994 Umetsu .................... G03B 7/26
396/284
5,671,160 A * 9/1997 Julian .................... G01C 15/00
33/293

(Continued)

FOREIGN PATENT DOCUMENTS

JP        2015-145784 A        8/2015

*Primary Examiner* — Nathnael Aynalem
(74) *Attorney, Agent, or Firm* — Chiesa Shahinian & Giantomasi PC

(57) ABSTRACT

When a camera and a surveying device are connected by a synchro cable, and a photographing condition obtaining unit obtains a photographing start time of the camera, a survey control unit makes a survey time measurement unit start time measurement. After the camera and the surveying device are disconnected, the survey control unit starts a survey by a predetermined surveying period ΔT when tracking of the prism starts. Based on the time measurement by the survey time measurement unit, the survey control unit associates the survey result with the photographing position of each image taken by the camera to generate the data for photogrammetry.

7 Claims, 8 Drawing Sheets

(56) References Cited

U.S. PATENT DOCUMENTS

| | | | |
|---|---|---|---|
| 9,201,422 B2 | 12/2015 | Ohtomo et al. | |
| 9,409,656 B2 | 8/2016 | Ohtomo et al. | |
| 9,609,282 B2 | 3/2017 | Ohtomo et al. | |
| 9,773,420 B2 | 9/2017 | Ohtomo et al. | |
| 10,234,287 B2* | 3/2019 | Siercks | G01C 15/002 |
| 2003/0133018 A1* | 7/2003 | Ziemkowski | H04N 5/2256 |
| | | | 348/211.2 |
| 2003/0160757 A1* | 8/2003 | Shirai | G01C 1/04 |
| | | | 345/156 |
| 2014/0055613 A1* | 2/2014 | Ohtomo | H04N 7/18 |
| | | | 348/144 |
| 2014/0240498 A1* | 8/2014 | Ohtomo | B64D 47/08 |
| | | | 348/144 |
| 2014/0371952 A1 | 12/2014 | Ohtomo et al. | |
| 2015/0220085 A1 | 8/2015 | Ohtomo et al. | |
| 2016/0049081 A1 | 2/2016 | Ohtomo et al. | |
| 2017/0336203 A1 | 11/2017 | Barnes et al. | |
| 2017/0355458 A1* | 12/2017 | Chen | B64C 39/024 |
| 2018/0109767 A1* | 4/2018 | Li | H04N 5/23206 |

* cited by examiner

SURVEYING DEVICE AND SURVEY SYSTEM

CROSS-REFERENCE TO RELATED APPLICATION

This application claims priority to Japanese Patent Application No. 2017-023658 filed on Feb. 10, 2017, the entire disclosure of which is incorporated by reference herein.

BACKGROUND

The present disclosure relates to a surveying device determining a position of a photographing device taking images for photogrammetry, and a survey system including the surveying device.

In typically known stereophotogrammetry, a movable body includes a camera (a photographing device), which takes images (static images and dynamic images) from two or more different positions, the images being used for a survey.

In particular, in recent photogrammetry, an unmanned air vehicle (UAV) is used as a movable body including a camera, which takes images from the sky. See Japanese Unexamined Patent Publication No. 2015-145784.

SUMMARY

Japanese Unexamined Patent Publication No. 2015-145784 discloses photogrammetry where positional information of a UAV is obtained from a GNSS and a total station (a position measurement device) to take images for survey at positions predetermined in a flight plan.

However, when the position of the UAV in a photographing operation is determined by the GNSS, such a position is less accurate than the position determined by the total station. It is also impossible to conduct a survey, e.g., in a building, in a tunnel, or under a bridge where a GNSS signal cannot be received.

On the contrary, when the position of the UAV is determined by the total station, the total station is away from the camera of the UAV during a photographing operation. Thus, the total station cannot recognize the time when the camera of the UAV conducts an actual photographing operation. Then, a time difference occurs between the photographing time and the surveying time so that the accuracy of the photogrammetry decreases.

In photogrammetry, a photographing operation may be performed so that the image contains a plurality of reference points to identify the photographing position of the image. However, this methodology requires reference points provided in advance in a target range for photogrammetry.

In view of the foregoing, it is an object of the present disclosure to provide a surveying device and a survey system with accuracy of photogrammetry improved without a GNSS or a reference point.

To achieve the object, the surveying device of an embodiment of the present disclosure is a surveying device determining a position of a photographing device provided in a movable body and taking an image by a predetermined photographing period, the surveying device comprising: a photographing condition obtaining unit capable of obtaining photographing condition information including at least a photographing start time from the photographing device; a time measurement unit performing time measurement depending on the photographing start time obtained by the photographing condition obtaining unit; a surveying unit determining a position of the photographing device by a predetermined surveying period; and a photographing position analysis unit associating a survey result obtained by the surveying unit with a photographing position of each image taken by the photographing device based on the time measurement of the time measurement unit, and generating data for photogrammetry.

The survey system of the embodiment of the present disclosure includes the surveying device and the photographing device.

According to an embodiment of the present disclosure containing the described-above means, the accuracy of photogrammetry can be improved without a GNSS or a reference point.

DETAILED DESCRIPTION

Embodiments of the present disclosure will be described below with reference to the drawings.

Figure 1:
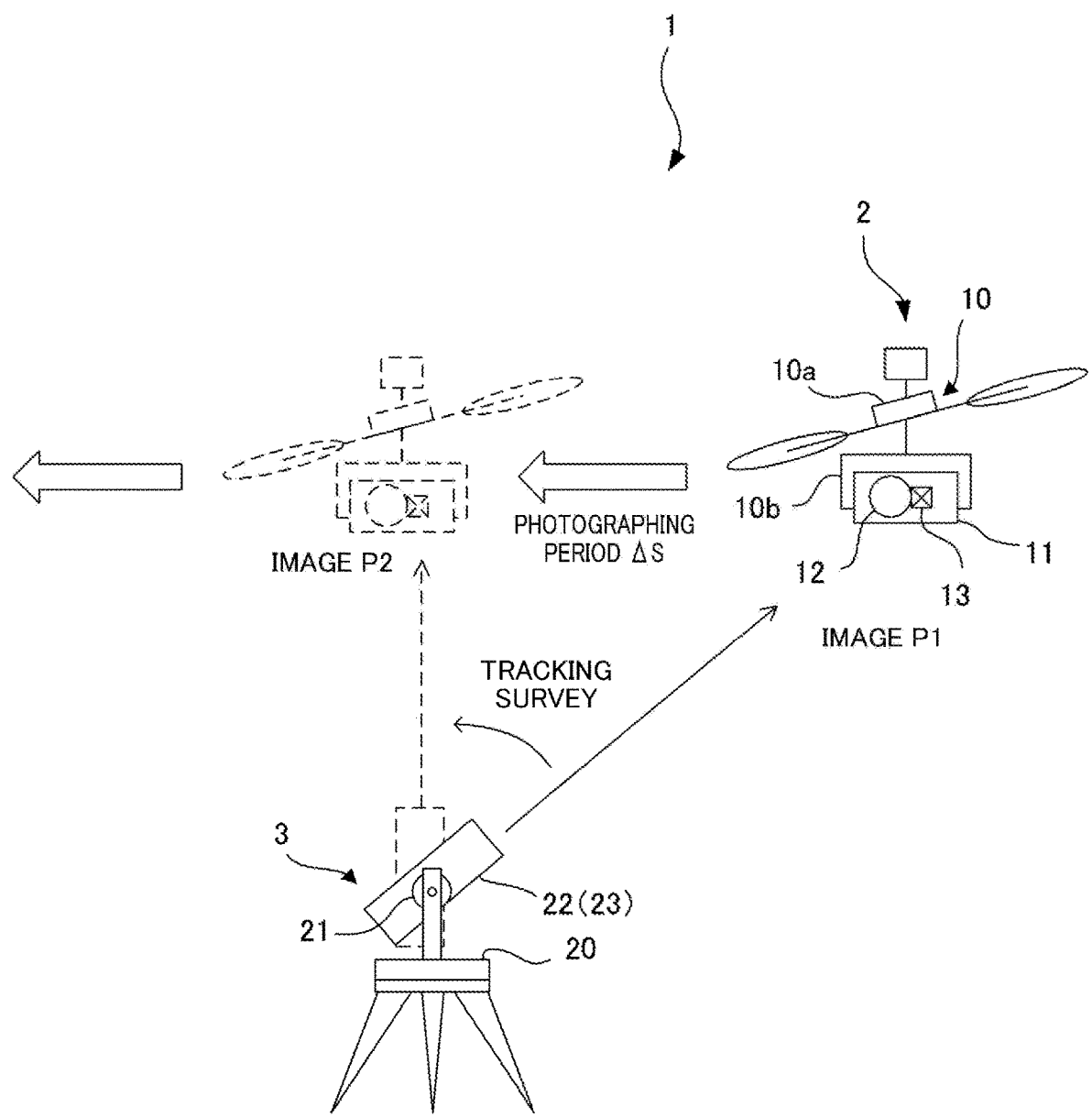
FIG. 1 is an overall configuration diagram of a survey system including a surveying device of one embodiment of the present disclosure.
Figure 2:
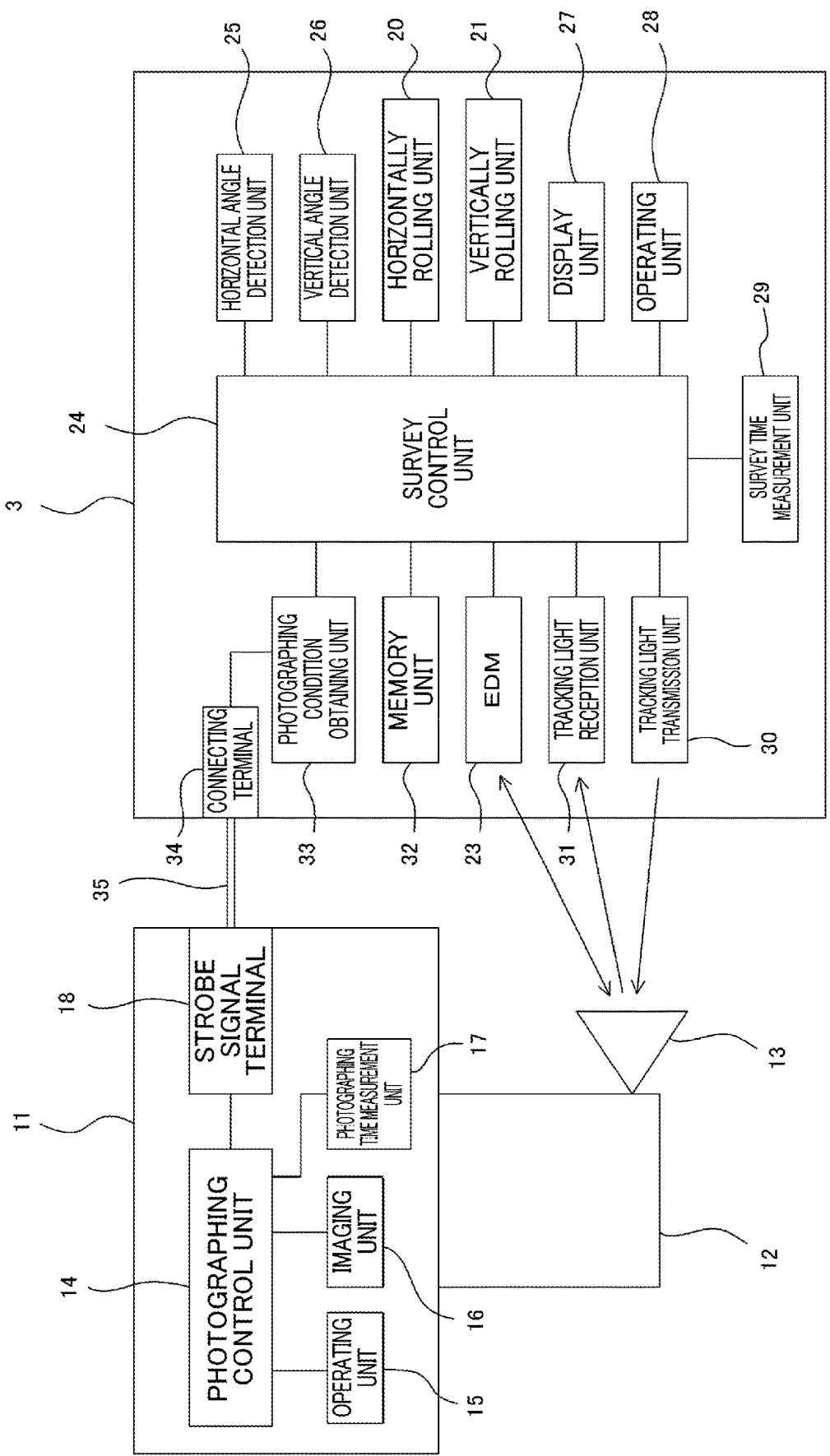
FIG. 2 is a control block diagram of the survey system of one embodiment of the present disclosure.

FIG. 1 is an overall configuration diagram of a survey system 1 of one embodiment of the present disclosure. FIG. 2 is a diagram of a control system of the survey system 1. The overall configuration and control system of the survey system 1 of the embodiment of the present disclosure will be described with reference to FIGS. 1 and 2.

The survey system 1 is a survey system for photogrammetry. The survey system 1 includes a movable photographing device 2 moving to take a plurality of images for photogrammetry, and a surveying device 3 determining a position of the movable photographing device 2.

The movable photographing device 2 is composed of a UAV 10, which is a movable body. The UAV 10 includes a camera 11 (a photographing device) taking images. Note that the image taken by the camera 11 may be a static image or a dynamic image.

Specifically, the UAV 10 is a flight movable body capable of flying through a predetermined flight path and freely flying by remote control. The UAV 10 includes a flight mechanism 10a for flight and a gimbal mechanism 10b provided below the flight mechanism 10a.

The camera 11 is supported by the gimbal mechanism 10b. The gimbal mechanism 10b enables the camera 11 to take images in any direction, and allows the camera 11 to have a stabilized attitude to take images in a fixed direction.

The camera 11 has a body having a front surface provided with a lens unit 12. The lens unit 12 has a front end beside which a prism 13 is provided.

The surveying device 3 is a total station capable of automatically tracking a survey object. The surveying device 3 includes a horizontally rolling unit 20 capable of rolling in a horizontal direction, a vertically rolling unit 21 capable of rolling in a vertical direction, and a telescope unit 22 provided on the horizontally rolling unit 20 through the vertically rolling unit 21. The telescope unit 22 is also provided with an electro-optical distance meter (EDM) 23 measuring a slope distance to a target.

Specifically, the surveying device 3 can perform prism survey for surveying the prism 13. That is, the surveying device 3 can measure a distance from the surveying device 3 to the prism 13, and also can measure a horizontal angle and a vertical angle formed by the surveying device 3 and the prism 13. Thus, the surveying device 3 arranged in a predetermined position and having an attitude in a leveled manner can survey the prism 13 to calculate coordinates of the prism 13, i.e., a position of the camera 11, based on the survey results (the slope distance, the horizontal angle, and the vertical angle).

In the survey system 1, as illustrated in FIG. 1, the movable photographing device 2 moves in the sky to take a plurality of images P1, P2, . . . for photogrammetry by a predetermined photographing period ΔS. Then, the surveying device 3 tracks and surveys the movable photographing device 2 (strictly, the prism 13). Then, this survey result is associated with photographing positions of the plurality of images P1, P2, . . . so that the data for photogrammetry is generated.

Next, referring to FIG. 2, the configuration of the control system based on the camera 11 and the computer of the surveying device 3 of the survey system 1 will be described.

As illustrated in FIG. 2, the camera 11 includes a photographing control unit 14. The photographing control unit 14 is electrically connected with an operating unit 15, an imaging unit 16, a photographing time measurement unit 17, and a strobe signal terminal 18. Note that the photographing control unit 14 may also be connected with a memory unit, a display unit, a communication unit etc., and may be connected with a sensor etc. At least images taken are stored in an internal or external memory unit.

The operating unit 15 is a control means for inputting various operational instructions or settings to the photographing control unit 14. Examples of the operational instructions include instructions for turning on or off a power supply, triggering a photographing operation, switching a photographing mode, setting a photographing period, setting an image quality, and turning on or off a connection with the surveying device 3. The operating unit 15 may also include any operating or input devices such as switches, buttons, and dials.

The imaging unit 16 performs a photographing operation. The imaging unit 16 includes an imaging device (such as a CCD and a CMOS device) converting an optical image into electrical signals, and a shutter.

The photographing time measurement unit 17 is, e.g., a timer counter including a crystal oscillator, and measures time used for various types of control conducted in the photographing control unit 14.

The strobe signal terminal 18 is, e.g., a hot shoe or a synchro terminal for a strobe. The strobe signal terminal 18 is a connecting terminal capable of communicating a shutter signal to external equipment.

The photographing control unit 14 can control the imaging unit 16 so that the imaging unit 16 performs a photographing operation by a predetermined photographing period ΔS. The photographing control unit 14 can also make the strobe signal terminal 18 convey a shutter signal and photographing conditions (such as the photographing period ΔS and the number of images taken) to external equipment. After the predetermined photographing operations are completed, the photographing control unit 14 can convey the photographing completion time and the image data obtained.

The surveying device 3 includes a survey control unit 24 (a photographing position analysis unit) connected with the horizontally rolling unit 20, the vertically rolling unit 21, and the EDM 23. The survey control unit 24 is also connected with a horizontal angle detection unit 25, a vertical angle detection unit 26, a display unit 27, an operating unit 28, a survey time measurement unit 29, a tracking light transmission unit 30, a tracking light reception unit 31, a memory unit 32, and a photographing condition obtaining unit 33.

The horizontal angle detection unit 25 detects a rolling angle of the horizontally rolling unit 20 in the horizontal direction to detect a horizontal angle collimated by the telescope unit 22. The vertical angle detection unit 26 detects a rolling angle of the vertically rolling unit 21 in the vertical direction to detect a vertical angle collimated by the telescope unit 22. The horizontal angle detection unit 25 and the vertical angle detection unit 26 detect a horizontal angle and a vertical angle, respectively, as survey results.

The display unit 27 is, e.g., a liquid crystal monitor. The display unit 27 can display various pieces of information such as survey results (a slope distance, a horizontal angle, a vertical angle).

The operating unit 28 is a control means for inputting various operational instructions or settings to the survey control unit 24. Examples of the operational instructions include instructions for turning on or off a power supply, triggering a survey, switching a survey mode, and setting a surveying period. Similarly to the operating unit 15 of the camera 11, the operating unit 28 may include any operating or input devices such as switches, buttons, and dials.

Similarly to the photographing time measurement unit 17, the survey time measurement unit 29 is, e.g., a timer counter including a crystal oscillator, and measures time used for various types of control conducted in the photographing control unit 14. Note that the survey time measurement unit 29 can measure the time by a shorter period (a higher frequency) than the photographing time measurement unit 17 does.

The tracking light transmission unit 30 emits tracking light. The tracking light reception unit 31 receives the tracking light reflected by the prism 13. The survey control unit 24 controls the horizontally rolling unit 20 and the vertically rolling unit 21 to enable a center portion of the tracking light reception unit 31 to keep receiving the tracking light from the tracking light transmission unit 30. As such, the function of tracking a target is achieved.

The survey memory unit 32 can store a program for the above-described tracking function; various programs for survey (such as a program for conducting a survey by a predetermined surveying period); and various pieces of data (such as the survey data as a survey result, and the image data obtained from the camera 11).

The photographing condition obtaining unit 33 obtains photographing condition information (such as a photographing start time based on the shutter signal from the camera 11, and the photographing period ΔS). In this embodiment, the photographing condition obtaining unit 33 is connected with a connecting terminal 34 provided in the surveying device 3. In this embodiment, a synchro cable 35 connects the strobe signal terminal 18 of the camera 11 with the connecting terminal 34 of the surveying device 3. Then, the photographing condition obtaining unit 33 receives the shutter signal from the camera 11 at the start of a photographing operation to obtain the photographing start time. Then, after the photographing operation is completed, the photographing condition obtaining unit 33 obtains the information (such as the photographing period ΔS and the number n of images taken) from the camera 11.

When the photographing condition obtaining unit 33 obtains the photographing start time of the camera 11, the survey control unit 24 makes the survey time measurement unit 29 start time measurement. Then, the survey control unit 24 starts a survey by a predetermined surveying period ΔT when tracking of the prism 13 starts. Then, based on the time measured by the survey time measurement unit 29, the survey result is associated with a photographing position of each image taken by the camera 11, such that the data for photogrammetry is generated.

Figure 3:
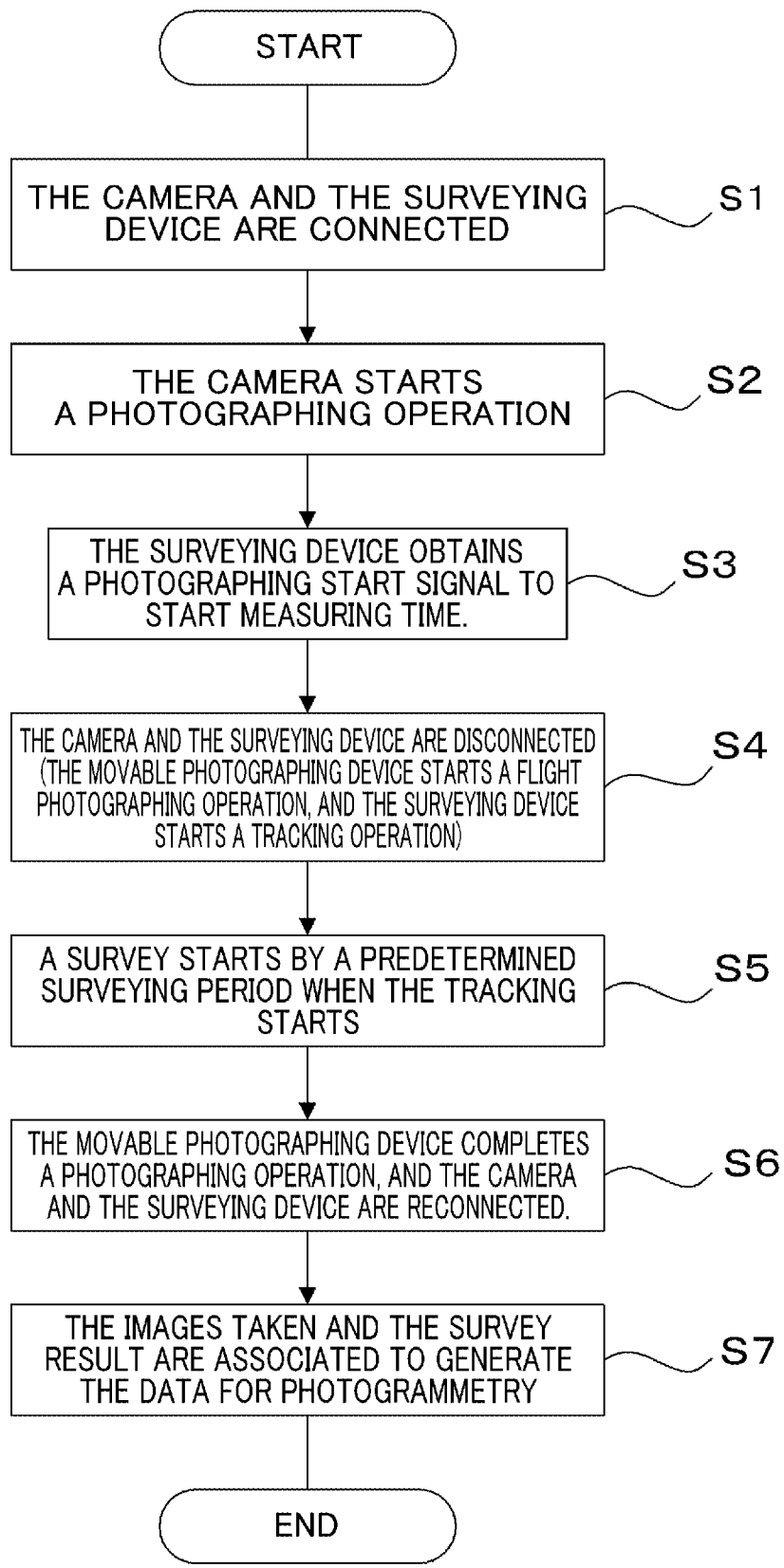
FIG. 3 is a flow chart showing a data analysis routine for photogrammetry in the survey system of one embodiment of the present disclosure.

Here, FIG. 3 is a flow chart of a data analysis routine for photogrammetry of the survey system of the embodiment. A specific flow of data analysis for photogrammetry of this embodiment will be described below along the flow chart.

First, in Step S1, the camera 11 of the movable photographing device 2 and the surveying device 3 are connected. Specifically, the synchro cable 35 connects the strobe signal terminal 18 of the camera 11 with the connecting terminal 34 of the surveying device 3.

Next, in Step S2, the camera 11 starts a photographing operation. The camera 11 conducts a photographing operation by a predetermined photographing period ΔS. The camera 11 connected with the surveying device 3 starts a photographing operation such that the shutter signal is sent to the surveying device 3 through the synchro cable 35.

Then, in Step S3, in the surveying device 3, the survey control unit 24 obtains a first shutter signal as a photographing start signal (a photographing condition) from the camera 11 through the photographing condition obtaining unit 33. Then, the survey control unit 24 makes the survey time measurement unit 29 start measuring time.

In Step S4, the synchro cable 35 is removed to disconnect the camera 11 from the surveying device 3. Then, the movable photographing device 2 starts a flight photographing operation. The surveying device 3 starts tracking the prism 13 of the camera 11.

In Step S5, Then, the surveying device 3 starts a survey by a predetermined surveying period ΔT when tracking of the prism 13 of the movable photographing device 2 starts. In this embodiment, the surveying period ΔT is shorter than the photographing period ΔS. For example, a survey is conducted by the surveying period ΔT=20 ms to 100 ms with respect to the photographing period ΔS=1 s to 3 s. Here, the survey control unit 24 generates survey data D on which the slope distance, the horizontal angle, the vertical angle, and a value of a time count Tt (time measurement data) measured by the survey time measurement unit 29 are stamped as survey results.

Next, in Step S6, after the movable photographing device 2 completes the predetermined photographing operation, the camera 11 and the surveying device 3 are reconnected by the synchro cable 35.

Then, in Step S7, in the surveying device 3, the photographing control unit 14 captures the image taken by the camera 11 to associate the survey result with the photographing position of the image to generate the data for photogrammetry. Then, the routine is ended.

Specifically, in this embodiment, in Step S7, depending on the photographing period ΔS and the number n of images taken by the camera 11, and based on the value of the time count Tt stamped on the survey data D, the photographing control unit 14 extracts the survey data D matching the photographing time Tc from the pieces of survey data D to associate this extracted survey data D with the photographing position of the image P to generate the data for photogrammetry.

Figure 4:
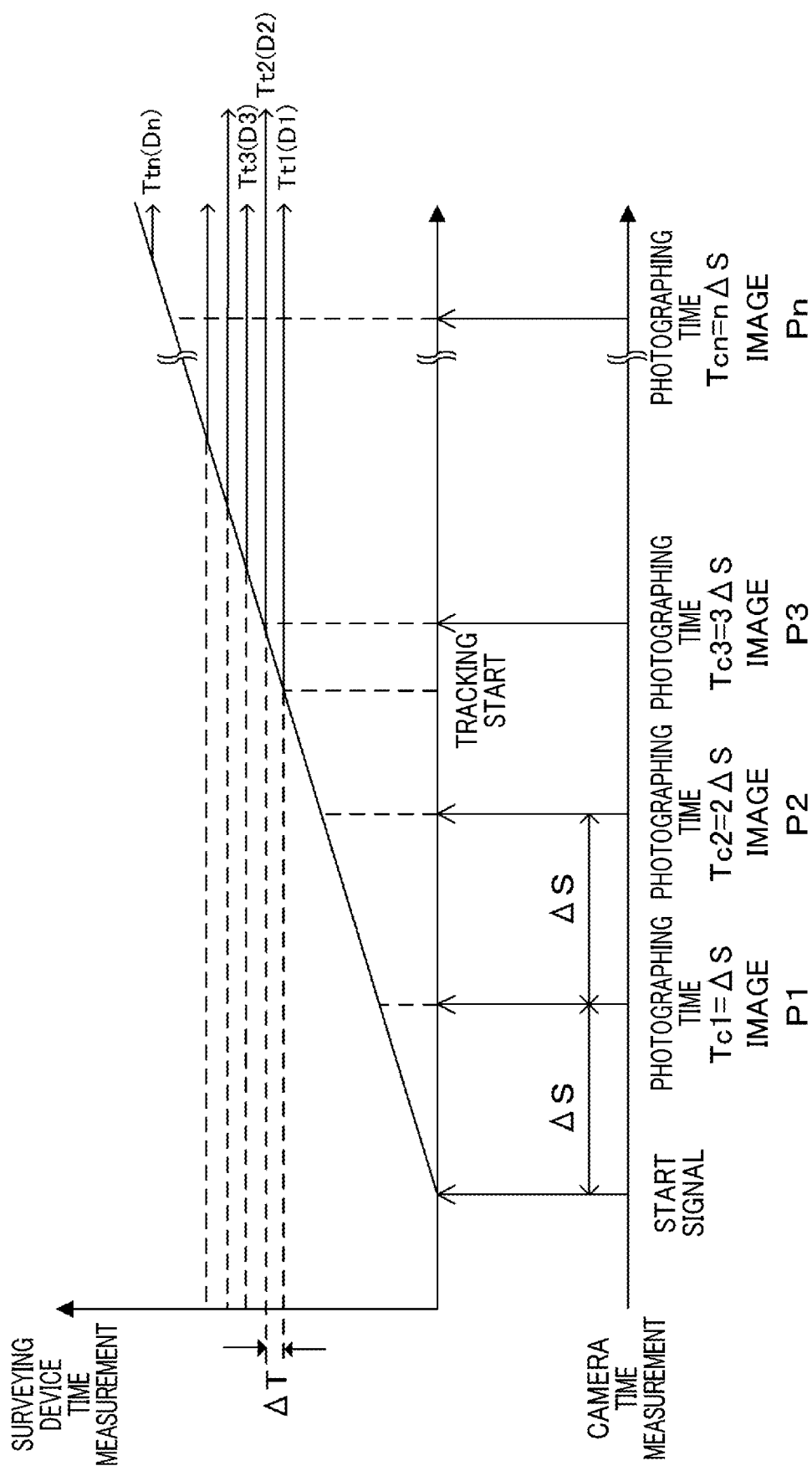
FIG. 4 is a time chart of operations (shown in time series) of a camera and surveying device of the survey system of one embodiment of the present disclosure.

Here, FIG. 4 is a time chart of operations (shown in time series) of the camera and surveying device of this embodiment. A more specific description of generation of the data for photogrammetry of this embodiment will be provided below with reference to the drawing.

As illustrated in FIG. 4, first, the surveying device 3 is connected with the camera 11. Then, the surveying device 3 recognizes the first shutter signal as a photographing start signal. Then, the survey time measurement unit 29 starts time measurement. On the other hand, the camera 11 conducts a photographing operation by a predetermined photographing period ΔS.

After the camera 11 and the surveying device 3 are disconnected, and the tracking of the prism 13 starts, the surveying device 3 conducts a survey by a predetermined surveying period ΔT, and stamps the value of the time count Tt on the survey data D.

After the predetermined photographing operations are completed, the camera 11 and the surveying device 3 are reconnected. In the surveying device 3, the photographing condition obtaining unit 33 obtains the image data taken by the camera 11 and the information (the photographing conditions) such as the photographing period ΔS and the number n of images taken. The photographing control unit 14 calculates the photographing time Tc of each image data based on the photographing period ΔS and the number n of images taken. The photographing time Tc is calculated like a photographing time Tc1 (of a first image P1 which is a first one counted from the photographing start signal)=ΔS, a photographing time Tc2 (of a second image P2)=2ΔS, and a photographing time Tcn (of an $n^{th}$ image Pn)=nΔS, where the $n^{th}$ image Pn is the image taken in the $n^{th}$ time.

Then, the survey data D of which the value of the time count Tt matches the photographing time Tc is extracted. For example, in FIG. 4, a photographing time Tc3 of a third image P3 matches a time count Tt2. Thus, survey data D2 is extracted as a survey result corresponding to the image P3. Similarly, for each image P, the matching survey data D is extracted.

Note that if the photographing time Tc does not match the value of the time count Tt of the survey data D, data before the survey data D and data after the survey data D may be used such that interpolation survey data Di is calculated and associated. For example, although not shown, if a photographing time Tc4 of a fourth image P4 is an intermediate value between the time counts Tt5 and Tt6, interpolation survey data Di56 composed of an intermediate value of slope distances, an intermediate value of horizontal angles, and an intermediate value of vertical angles of survey data D5 and D6 is associated with the image P4. In FIG. 4, ΔT is less than or equal to 100 ms, and ΔS is a few seconds. In ΔS, an almost uniform linear motion is performed. That is, in ΔS, the values of both a measured angle and a measured distance increase or decrease in an almost regular manner. Thus, even when ΔT is determined with interpolation, an accuracy of positional estimation is maintained.

The survey data D extracted in this manner and the image P are associated such that the image data including the information about an accurate position determined by the surveying device 3 is generated as data for photogrammetry.

As described above, the surveying device 3 performs time measurement from a photographing start time of the camera 11 performing a photographing operation by a predetermined photographing period ΔS. Based on this time measurement, the surveying device 3 associates the survey result with each image taken to generate the data for photogrammetry. Thus, the surveying device 3 can generate the data for photogrammetry including the information about an accurate position determined by surveying device 3 and stamped on each image taken by the camera 11. This improves the accuracy of photogrammetry without a GNSS or a reference point.

The description of the embodiment of the present disclosure is now ended, but the aspect of the present disclosure is not limited to this embodiment.

In the embodiment described above, the strobe signal terminal 18 and the connecting terminal 34 are connected by the synchro cable 35, and consequently the camera 11 and the surveying device 3 are connected. This provides reliable communication between the camera 11 and the surveying device 3. However, this connecting means between the camera 11 and the surveying device 3 is merely an example. For example, the camera 11 and the surveying device 3 may be connected through wireless communication.

Figure 5:
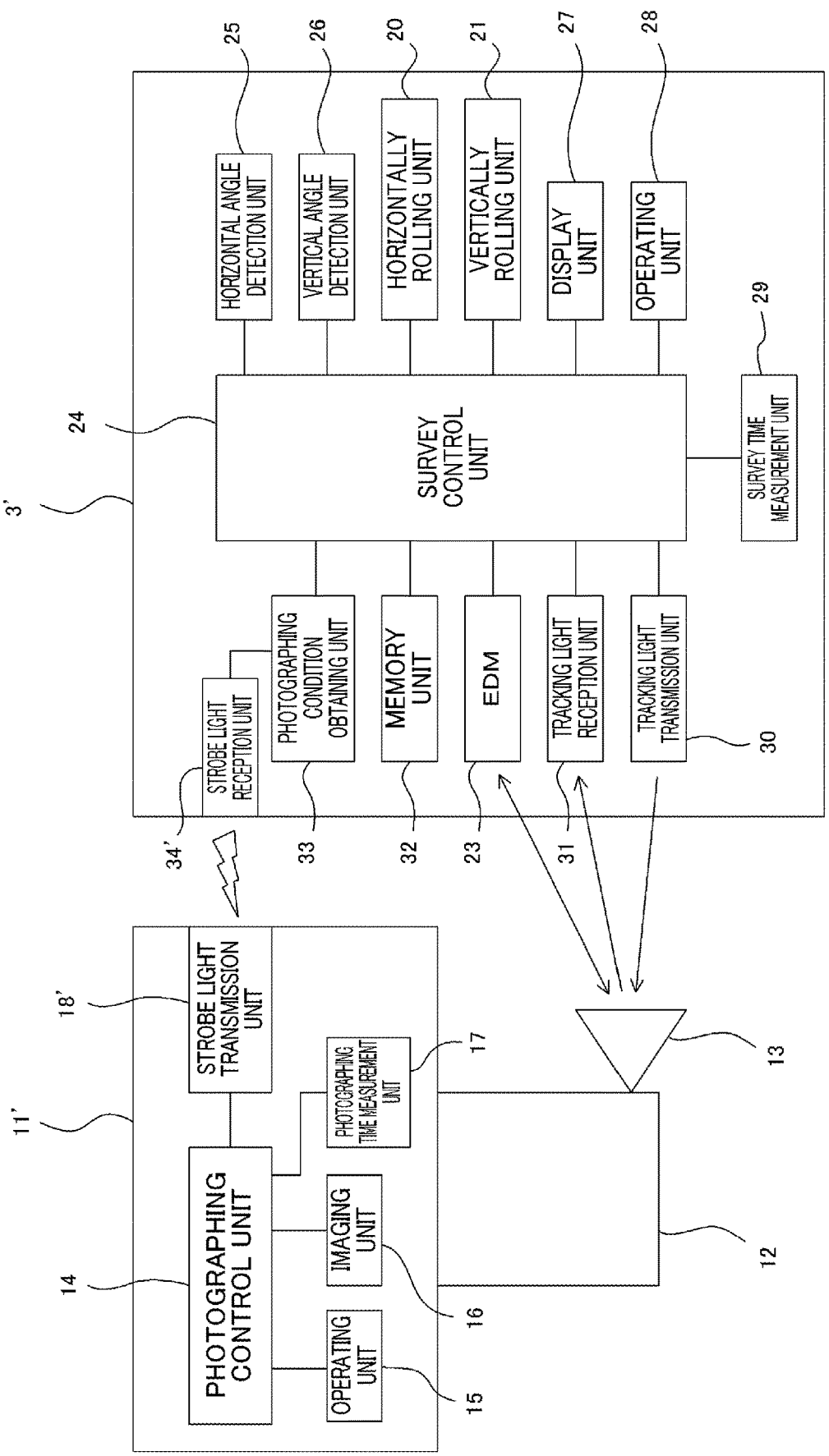
FIG. 5 is a control block diagram of a survey system of a first variation.

The camera 11 may include a strobe to convey a shutter signal to the surveying device 3. Specifically, FIG. 5 is a control block diagram of a survey system of a first variation.

As illustrated in the figure, in the first variation, a survey system 1' includes a camera 11' having a strobe light transmission unit 18' transmitting strobe light in response to a photographing operation instead of the strobe signal terminal 18 of the camera 11 of the embodiment described above. In the first variation, a surveying device 3' includes a strobe light reception unit 34' detecting strobe light instead of the connecting terminal 34. Note that, instead of the strobe light transmission unit 18', a strobe light transmission unit which the camera 11' typically includes may be used. Instead of the strobe light reception unit 34', an illuminance sensor or tracking light reception unit of the surveying device 3' (such as a total station) may be used. The other configurations are the same as, or similar to, those of the above-described embodiment, and labeled with the same reference characters, and the detailed descriptions thereof will be omitted. This also applies to the other variations.

In the survey system 1' of the first variation as described above, the strobe light that the strobe light transmission unit 18' transmits in response to the shutter signal of the camera 11' is detected by the strobe light reception unit 34' of the surveying device 3'. In the surveying device 3', a photographing condition obtaining unit 33 recognizes the detection information about that strobe light as a photographing start time of the camera 11'. The procedures thereafter (after Step S3 in FIG. 3) are the same as, or similar to, those of the embodiment described above.

As such, in the survey system 1' of the first variation, the configurations that the camera 11' and surveying device 3' typically have may be used so that the surveying device 3' can recognize the photographing start time of the camera 11' without a wired connection such as a synchro cable. Thus, the first variation can provide reduction in additional costs, and can more easily provide the advantages than the embodiment described above does.

In the embodiment described above, the surveying device 3 is reconnected with the camera 11 after the photographing operations are completed. Then, the photographing time Tc is calculated from the photographing period ΔS and the number n of images taken, and the matching survey data D is extracted from the survey results and associated with the image P. However, this methodology of analysis is merely an example.

Figure 6:
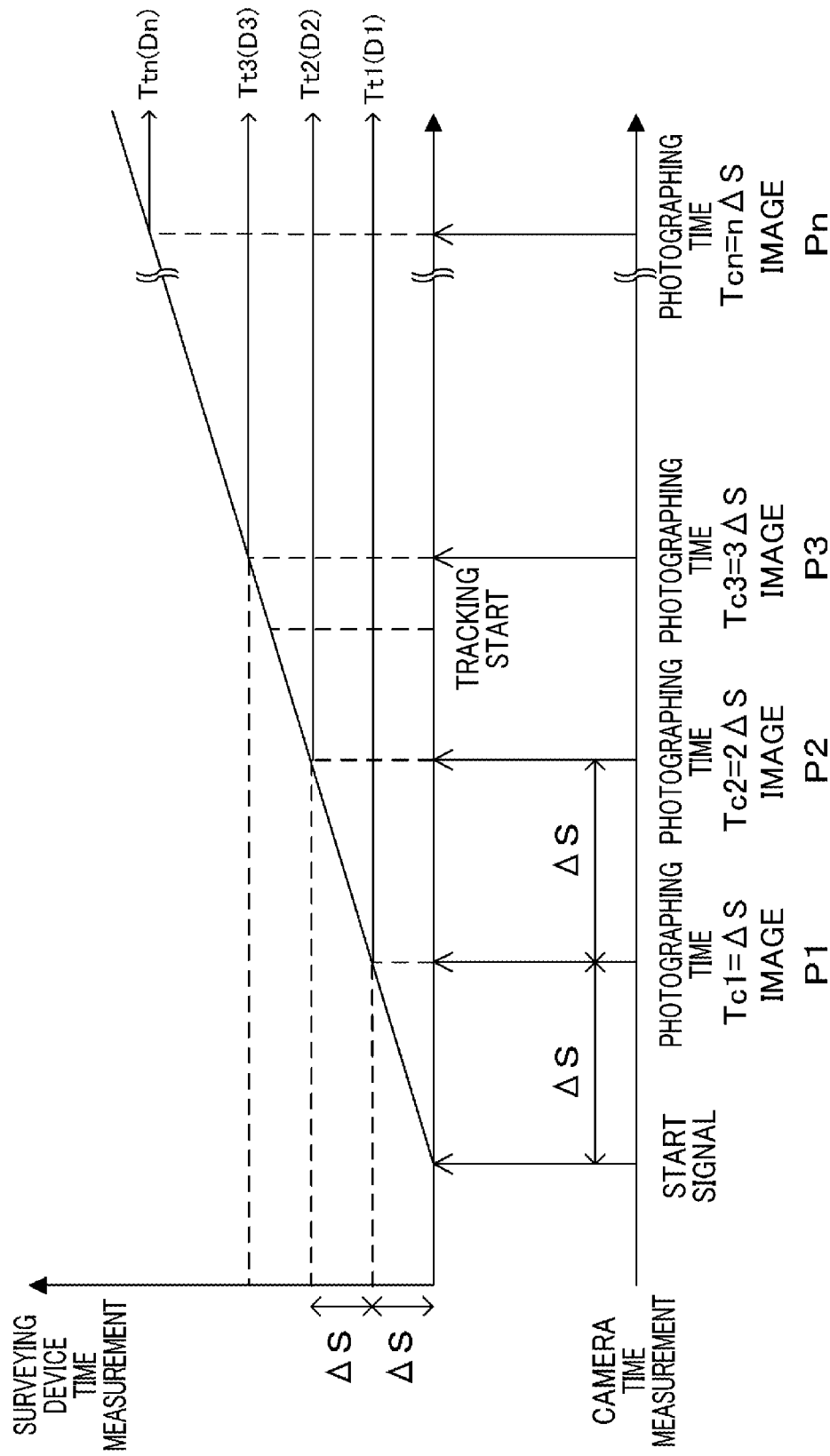
FIG. 6 is a time chart of operations (shown in time series) of a camera and surveying device of a survey system of a second variation.

For example, FIG. 6 is a time chart of a second variation of which the methodology of analysis is different from that of the embodiment described above.

In the second variation, in a step corresponding to Step S3 in FIG. 3 of the embodiment described above, a surveying device 3 obtains a shutter signal and a photographing period ΔS from a camera 11, or includes a photographing condition obtaining unit 33 that receives a photographing period ΔS of the camera 11 in advance so that the surveying device 3 recognizes the photographing period ΔS at the time of start of a photographing operation.

Then, in the surveying device 3, the survey control unit 24 obtains a shutter signal to start a photographing operation, and then starts time measurement and a survey by a predetermined surveying period ΔT. During a photographing operation by a movable photographing device 2, only the survey result of which the value of the time count Tt matches the photographing period ΔS is output to a memory unit 32 and a display unit 27. Note that, regarding the survey result obtained before the tracking starts, a slope distance, a horizontal angle, and a vertical angle are regarded as empty data, and survey data D including only the time count Tt is stored. Also in this variation, if there is no survey result matching the photographing period ΔS, data before and after the survey data might be used so that interpolation survey data is calculated.

After the predetermined photographing operations are completed, the camera 11 and the surveying device 3 are reconnected. in the surveying device 3, the survey control unit 24 associates an image P with the survey data D where the photographing order of the image P matches the surveying order of the survey data D, like a first image P1 with first survey data D1, a second image P2 with second survey data D2, and an $n^{th}$ image Pn with $n^{th}$ survey data Dn, to generate the data for photogrammetry.

In such a second variation, in addition to the advantages of the embodiment described above, it is possible to check positional information about the movable photographing device 2 performing a photographing operation. Thus, the flight plan can be confirmed or revised during a photographing operation conducted by the movable flight of photographing device 2 in flight.

In the second variation, only the survey data D matching the photographing period ΔS is stored. Thus, the survey data D unnecessary in the surveying device 3 can be reduced, and the data can be output without redundancy.

In the embodiment described above, the photographing period ΔS determined in the camera 11 are used to associate the image P taken and the survey data D. In this case, the calculation in the surveying device 3 might have an error due to, e.g., an accuracy difference between the photographing time measurement unit 17 in the camera 11 and the survey time measurement unit 29 in the surveying device 3. To address this issue, the photographing period may be calculated in the surveying device 3 based on an actual photographing operation of the camera 11. Third and fourth variations relating to calculation of the photographing period in the surveying device 3 will be described below.

Figure 7:
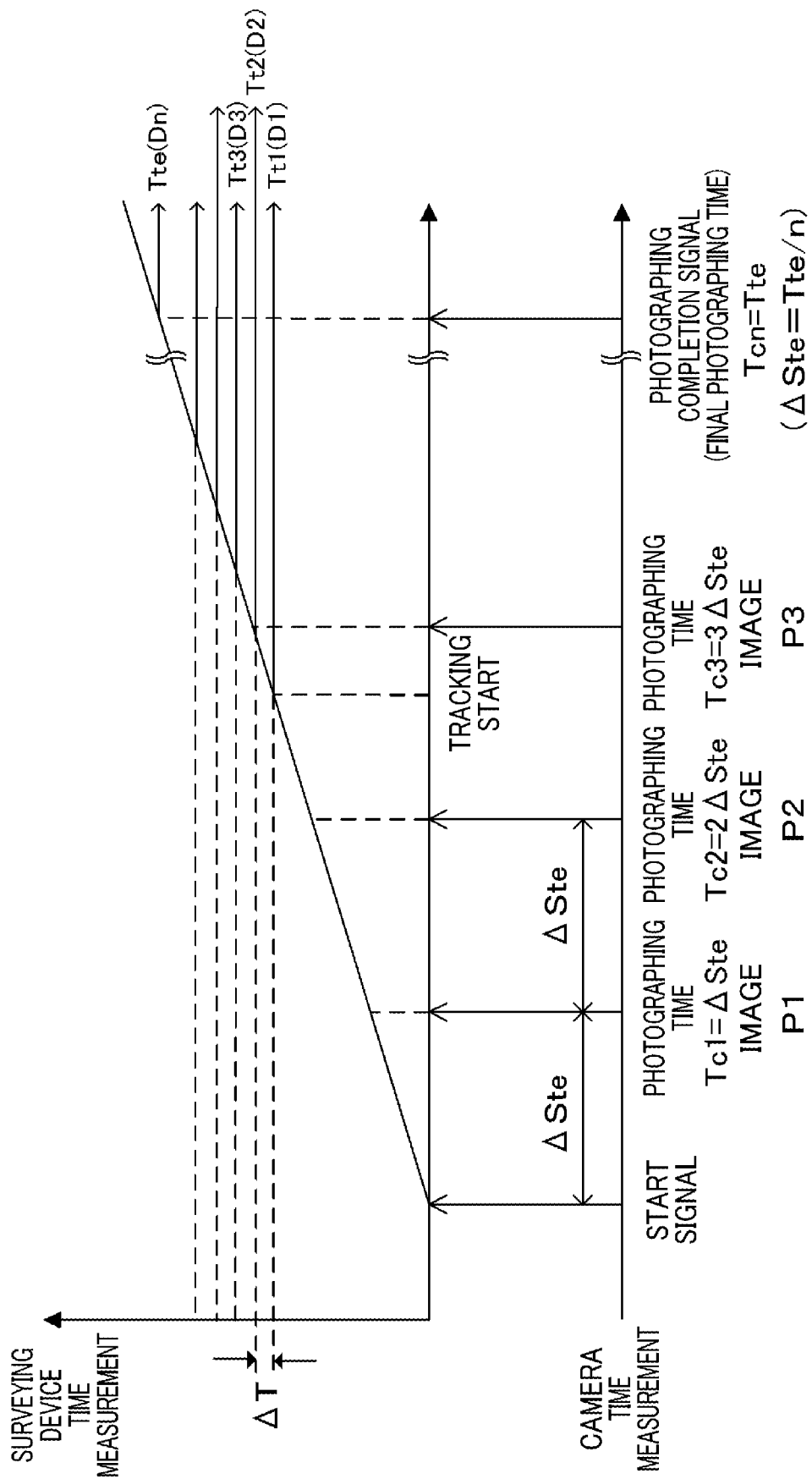
FIG. 7 is a time chart of operations (shown in time series) of a camera and surveying device of a survey system of a third variation.

First, FIG. 7 is a time chart of the third variation. The third variation will be described with reference to this drawing.

In the third variation, steps (corresponding to Steps S1 to S5) taken before the step where a camera 11 and a surveying device 3 are reconnected are the same as, or similar to, those of the embodiment described above.

In the third variation, after the camera 11 and the surveying device 3 are reconnected, the photographing condition obtaining unit 33 receives a final shutter signal from the camera 11. This signal is recognized as a photographing completion signal. A time count Tte corresponding to this photographing completion signal represents time from a start to completion of a photographing operation measured in the surveying device 3. This time count Tte is evenly divided by the number n of images taken, and consequently a corrected photographing period ΔSte (=Tte/n) is calculated.

Then, a photographing time Tc is calculated based on the corrected photographing period ΔSte. Then, similarly to the embodiment described above, the survey result of which the value of the time count Tt matches the photographing time Tc is extracted from the pieces of survey data D. Then, the extracted survey data D and the image P are associated to generate the data for photogrammetry.

As such, in the third variation, the corrected photographing period ΔSte is calculated based on the time measurement performed in the surveying device 3, and the image P and the survey data D are associated based on the corrected photographing period ΔSte. Thus, it is unnecessary to obtain the photographing period ΔS from the camera 11, and more accurate data for photogrammetry can be generated regardless of accuracy of the photographing time measurement unit 17 in the camera 11.

Figure 8:
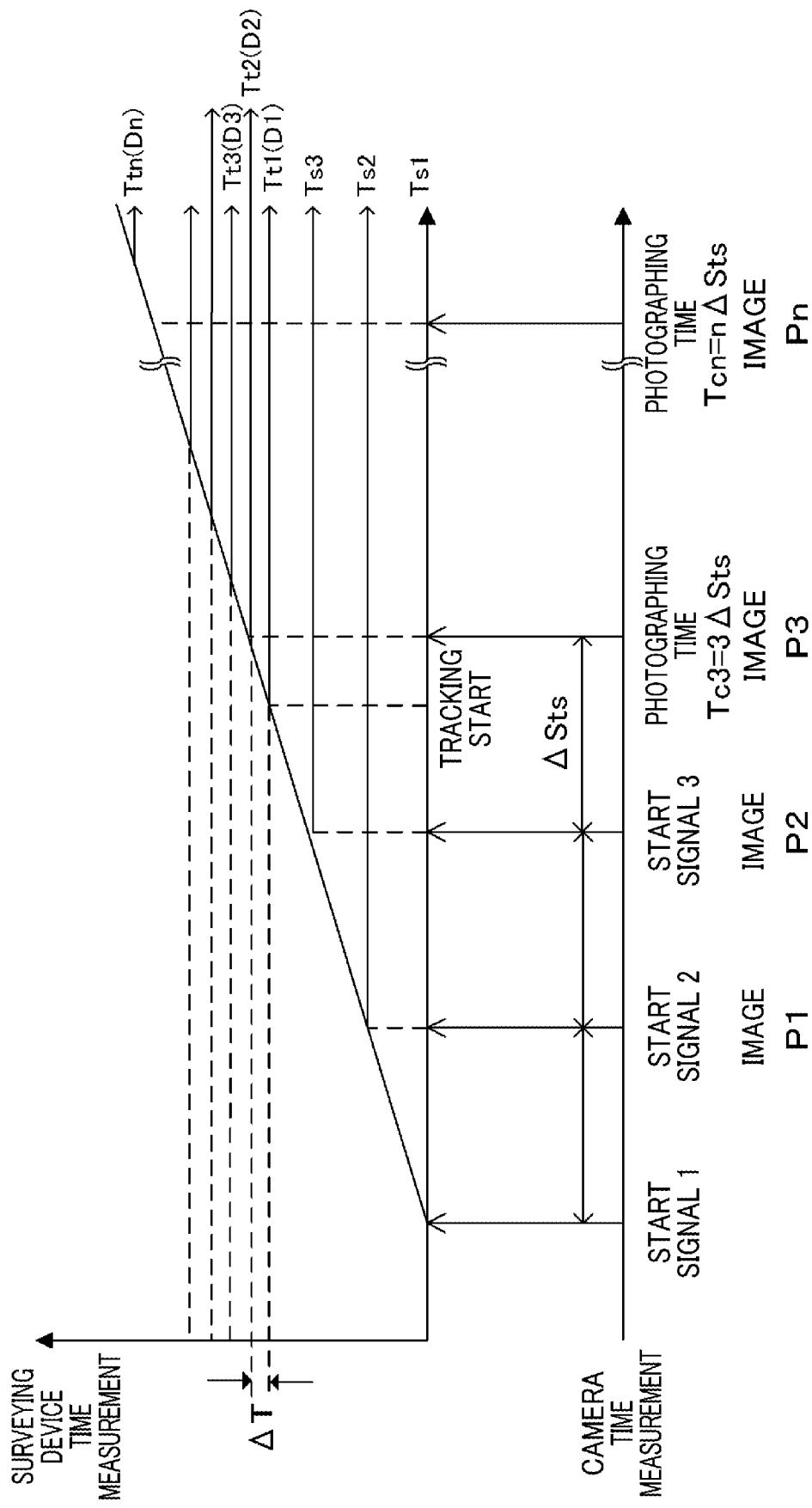
FIG. 8 is a time chart of operations (shown in time series) of a camera and surveying device of a survey system of a fourth variation.

Next, FIG. 8 is a time chart of the fourth variation. The fourth variation will be described with reference to this drawing.

In the fourth variation, a camera 11 and a surveying device 3 are connected when a photographing operation starts. In this state, in the surveying device 3, the photographing condition obtaining unit 33 obtains shutter signals (photographing information) from a camera 11 successively a plurality of times (the number m of photographing operations executed, m=3 in FIG. 8). The photographing condition obtaining unit 33 recognizes each of the shutter signals produced m times as a start signal. In response to the first start signal, the survey time measurement unit 29 starts time measurement. The survey control unit 24 evenly divides, by "the number of start signals−1," a time count Tsm from the first start signal (m=1) to a final start signal (m) of the start signals produced m times to calculate a corrected photographing period ΔSts (=Tsm/(m−1)).

Then, a photographing time Tc is calculated based on the corrected photographing period ΔSts. Then, similarly to the embodiment described above, the survey data D of which the value of the time count Tt matches the photographing time Tc is extracted from the pieces of survey data D. Then, the extracted survey data D and the image P are associated to generate the data for photogrammetry.

As such, also in the fourth variation, the corrected photographing period ΔSts is calculated based on the time measurement performed in the surveying device 3, and the image P and the survey data D are associated based on the corrected photographing period ΔSts. Thus, it is unnecessary to obtain the photographing period ΔS from the camera 11, and more accurate data for photogrammetry can be generated regardless of accuracy of the time measurement unit in the camera 11.

In the embodiment and variations described above, the movable photographing device 2 is composed of the UAV 10 as a movable body. However, the movable body is not limited thereto, and may be a movable body moving on the ground, such as a vehicle or a human.

In the embodiment described above, the photographing position is analyzed by the survey control unit 24 of the surveying device 3. However, this photographing position analysis unit is merely an example, and may be an external device such as a personal computer.

What is claimed is:

1. A surveying system comprising:
   a photographing device provided in a movable body and taking an image during a predetermined photographing period; and
   a surveying device determining a position of the photographing device, the surveying device comprising:
      a photographing condition obtaining unit capable of obtaining photographing condition information including at least a photographing start time, the predetermined photographing period, and a number n of images by receiving a shutter signal from the photographing device while being connected with the photographing device through a synchro cable;
      a survey time measurement unit performing time measurement depending on the photographing start time obtained by the photographing condition obtaining unit even while being not connected with the photographing device through the cable, the photographing device:
         transmitting a photographing start signal while being connected to the photographing condition obtaining unit;
         thereafter moving, and starting a photographing operation while being disconnected from the photographing condition obtaining unit; and
         taking images during a predetermined photographing period;
      a surveying unit tracking the photographing device and determining a position of the photographing device during a predetermined surveying period;
      a survey control unit stamping a value of time count measured by the survey time measurement unit to a survey result measured by the surveying unit; and
      a photographing position analysis unit:
         calculating a photographing time based on the photographing condition information and the value of time count measured by the survey time measurement unit,
         associating a survey result obtained by the surveying unit and matching the photographing time with a photographing position of each image taken by the photographing device and
         generating data for photogrammetry.

2. The surveying system of claim 1, wherein
   the surveying unit determines a position of the photographing device during a surveying period shorter than the predetermined photographing period after the photographing start time obtained by the photographing condition obtaining unit;
   the photographing condition obtaining unit obtains the predetermined photographing period and a number n of images taken by the photographing device, where n is an integer, as the photographing condition information after the photographing device completes a photographing operation; and the photographing position analysis unit
calculates a photographing time of each image from the photographing period and the number n of images taken by the photographing device,
extracts a survey result matching the photographing time from the survey result obtained by the surveying unit based on a value of a time count measured by the survey time measurement unit,
associates the extracted survey result as a photographing position of each image taken by the photographing device, and
generates data for photogrammetry.

3. The surveying system of claim 1, wherein
the photographing condition obtaining unit obtains information about the photographing start time and the predetermined photographing period as the photographing condition; and
during a photographing operation by the photographing device, the photographing position analysis unit
stores only the survey result of a time matching the predetermined photographing period out of the survey result obtained by the surveying unit,
associates the image with the survey result where a photographing order of the image matches a surveying order of survey data, and
generates data for photogrammetry.

4. The surveying system of claim 2, wherein
after the photographing device completes a photographing operation, the photographing position analysis unit
captures each image taken by the photographing device reconnected by a synchro cable, and
calculates a photographing period based on a time from a start to completion of the photographing operation and the number n of images taken by the photographing device.

5. The surveying system of claim 1, wherein
the photographing condition obtaining unit
obtains a plurality of shutter signals of the photographing device successively as the photographing start time while being connected with the photographing device through the synchro cable, and
calculates a photographing period based on a time from a first shutter signal to a final shutter signal as the photographing start time and a number m of shutter signals, where m is an integer.

6. A surveying system comprising:
a photographing device provided in a movable body and taking an image during a predetermined photographing period; and
a surveying device determining a position of the photographing device, the surveying device comprising:
a photographing condition obtaining unit including a strobe light reception unit detecting strobe light transmitted by the photographing device performing a photographing operation, and capable of obtaining photographing condition information by receiving the strobe light of the photographing device through the strobe light reception unit;
a survey time measurement unit performing time measurement, even while being not connected with the photographing device, depending on a photographing start time obtained by the photographing condition obtaining unit; the photographing device:
including a strobe light transmission unit transmitting the strobe light to the strobe light reception unit, which, in response to detecting the strobe light, transmits a photographing start signal to the photographing condition obtaining unit,
thereafter moving, and starting a photographing operation, and
taking images during a predetermined photographing period;
a surveying unit tracking the photographing device and determining a position of the photographing device during a predetermined surveying period;
a survey control unit stamping a value of time count measured by the survey time measurement unit to a survey result measured by the surveying unit; and
a photographing position analysis unit calculating a photographing time based on the photographing condition information and the value of time count measured by the survey time measurement unit, associating a survey result obtained by the surveying unit, matching the photographing time with a photographing position of each image taken by the photographing device and generating data for photogrammetry.

7. A method for determining a position of a photographing device provided in a movable body and taking an image during a predetermined photographing period, the method comprising:
obtaining, by a photographing condition obtaining unit, photographing condition information including at least a photographing start time, the predetermined photographing period, and a number n of images, by receiving a shutter signal from the photographing device while being connected with the photographing device through a synchro cable;
performing, by a survey time measurement unit, survey time measurement depending on the photographing start time even while being not connected with the photographing device through the synchro cable;
transmitting, by the photographing device, a photographing start signal while being connected with a photographic condition obtaining unit;
thereafter moving the photographing device, and starting photographing operations while being disconnected from the photographing condition obtaining unit;
taking images, by the photographing device, during a predetermined photographing period;
obtaining a survey result by a surveying unit tracking the photographing device and determining a position of the photographing device during a predetermined surveying period;
stamping, by a survey control unit, a value of time count measured by the survey time measurement unit to the survey result measured by the surveying unit; and
analyzing, by the survey control unit, photographing position by calculating a photographing time based on the photographing condition information and the value of time count measured by the survey time measurement unit, associating the survey result that matches the photographing time with a photographing position of each image taken by the photographing device, and generating data, for photogrammetry.

* * * * *